Aug. 22, 1944.　　　C. G. FOGLE　　　2,356,155
AIRPLANE TANK
Filed Sept. 15, 1941　　　10 Sheets-Sheet 6

Clayton G. Fogle   INVENTOR.

BY
Victor J. Evans & Co.
ATTORNEYS

Aug. 22, 1944.  C. G. FOGLE  2,356,155
AIRPLANE TANK
Filed Sept. 15, 1941   10 Sheets-Sheet 7

Fig. 10.

Clayton G. Fogle  INVENTOR.
BY
Victor J. Evans & Co.
ATTORNEYS

Aug. 22, 1944.  C. G. FOGLE  2,356,155
AIRPLANE TANK
Filed Sept. 15, 1941  10 Sheets-Sheet 8

Clayton G. Fogle INVENTOR.
BY
Victor J. Evans & Co.
ATTORNEYS

Aug. 22, 1944.                C. G. FOGLE                2,356,155
                             AIRPLANE TANK
                          Filed Sept. 15, 1941         10 Sheets-Sheet 10

Clayton G. Fogle  INVENTOR.

BY
Victor J. Evans & Co.
ATTORNEYS

Patented Aug. 22, 1944

2,356,155

UNITED STATES PATENT OFFICE 2,356,155

AIRPLANE TANK

Clayton G. Fogle, Williamsport, Pa.

Application September 15, 1941, Serial No. 410,937

7 Claims. (Cl. 244—118)

This invention relates to a combination airplane and tank.

An object of my invention is to provide an armored car or tank and an airplane structure for incorporating the tank in a fighting or transportation airplane, in which a novel lift and turntable structure is incorporated in the plane for loading and unloading the tank as well as to facilitate rotary movement of the tank when projected to a position outside the plane, as when the tank is being employed for firing purposes. Means are provided whereby the tank may be released while in the air and dropped by parachute, and in which the tank may be detached from the airplane on the ground and employed as a self-contained and maneuverable armored car.

In the embodiment selected for illustration, I make use of a frame structure 20 which is incorporated in the fuselage of an airplane, a portion of the fuselage being indicated at 22. Upon the base structure of the frame 20 is mounted two base castings 24 made secure by volts 26. To each casting 24 is secured two vertical guide rods 28, the rods in each pair being arranged in parallelism one with the other. Sockets 30 are secured to the upper structure of the frame 20 for supporting the upper ends of the guide rods 28. A yoke 32 is slidably connected with each pair of guide rods 28, and each yoke includes a hub 34 threadedly connected with a vertical screw 36. The lower ends of the screws 36 are rotatably journaled in bearings 38 on the castings 24 while the upper ends of the screws are rotatably journaled in bearings 40 carried by brackets 42 welded to the channels 44 of the frame 20.

Figure 1:
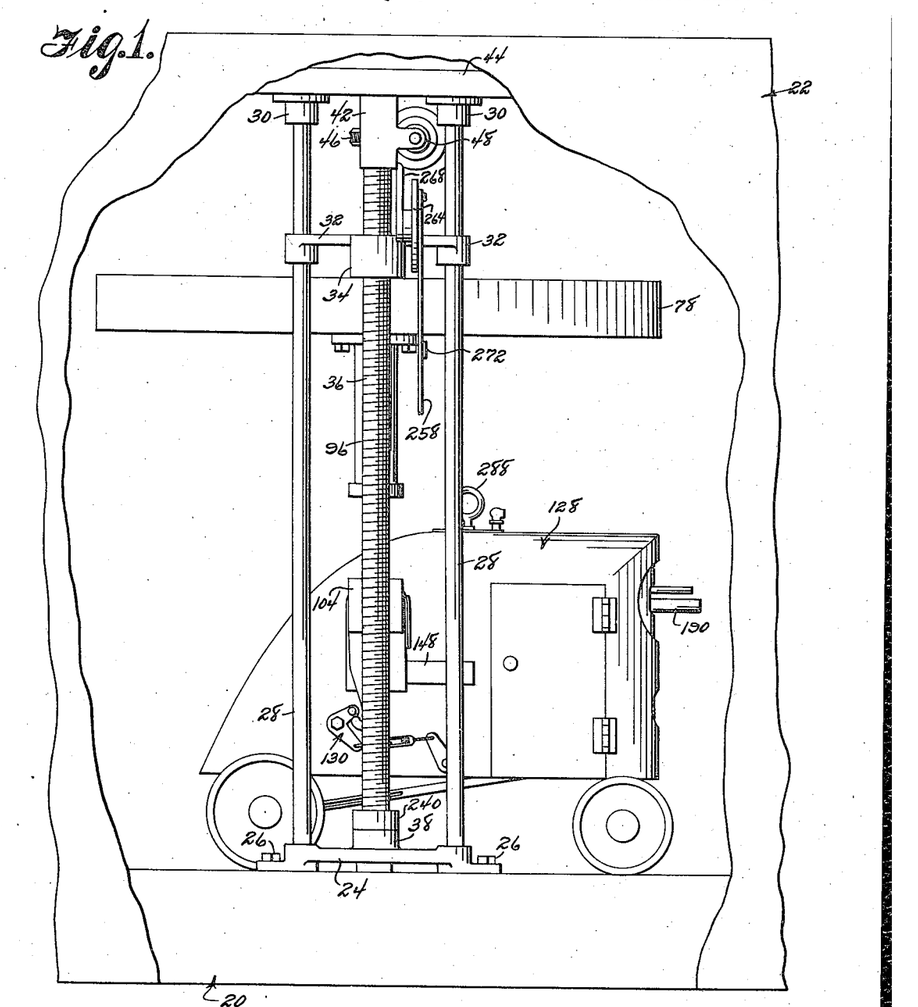
Figure 1 is a side elevational view of a tank and the tank loading or unloading facilities incorporated in the airplane.
Figure 2:
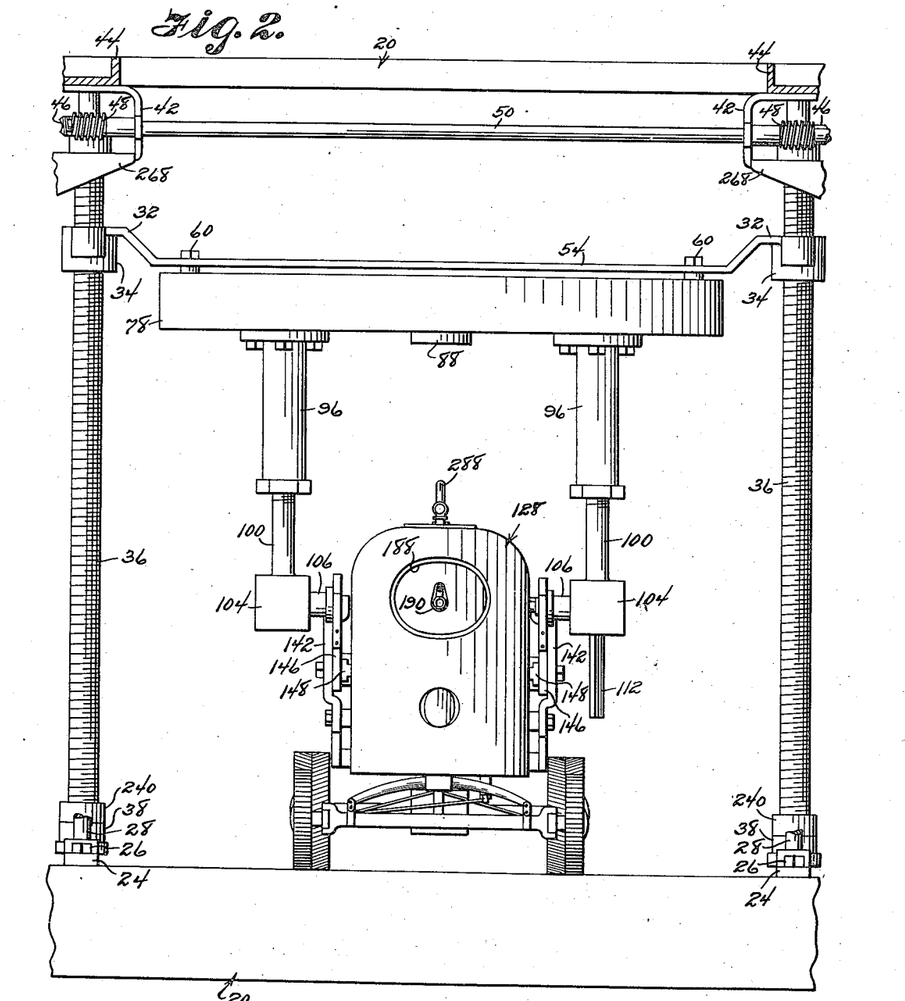
Figure 2 is a front elevational view of the tank and the structure of Figure 1.
Figure 3:
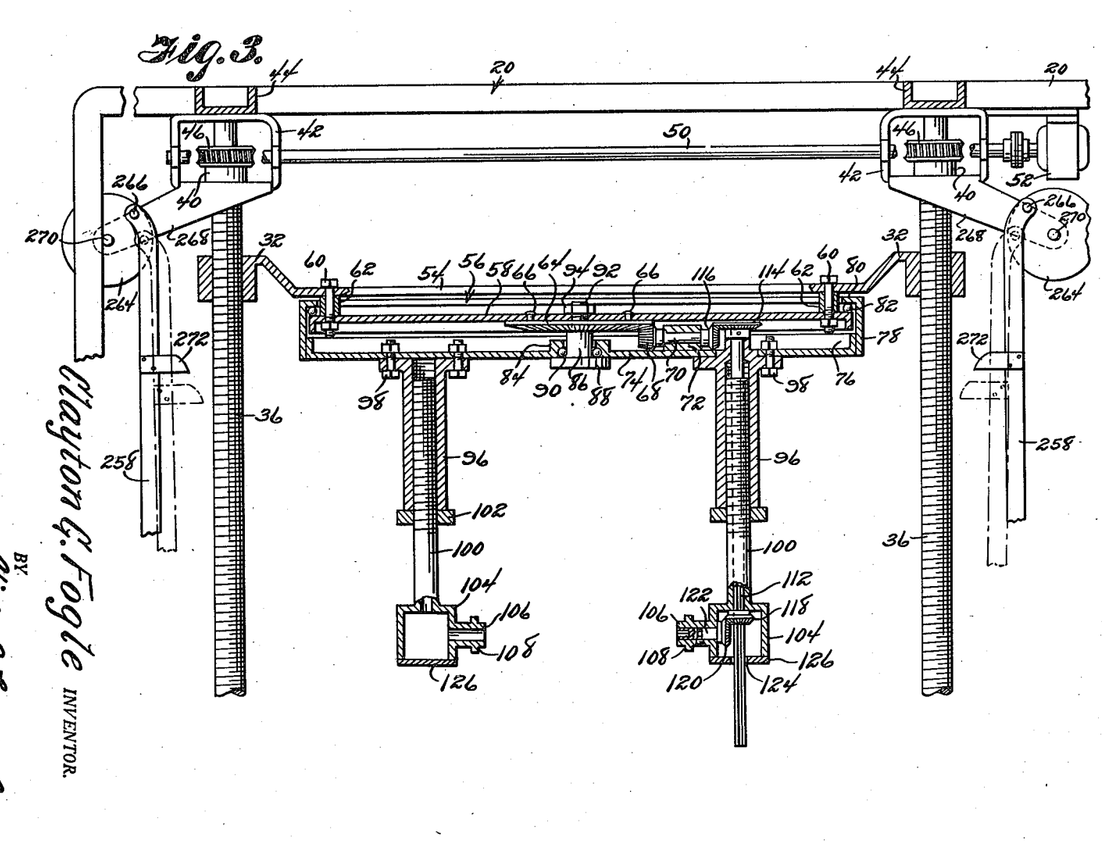
Figure 3 is a sectional view of the turntable mechanism.

Each screw 36 has a worm gear 46 keyed thereto near its upper end, see Figure 3, and worms 48 keyed to a drive shaft 50, see Figure 2, mesh with the worm gears 46, the drive shaft 50 being rotatably journaled in the brackets 42. Figure 3 illustrates a reversible motor 52 connected with the drive shaft 50 and mounted on the frame 20. Thus rotation of the drive shaft 50 imparts rotary motion to the screws 36 for raising or lowering the yokes 32, depending upon the direction of rotation of the drive shaft.

Figure 6:
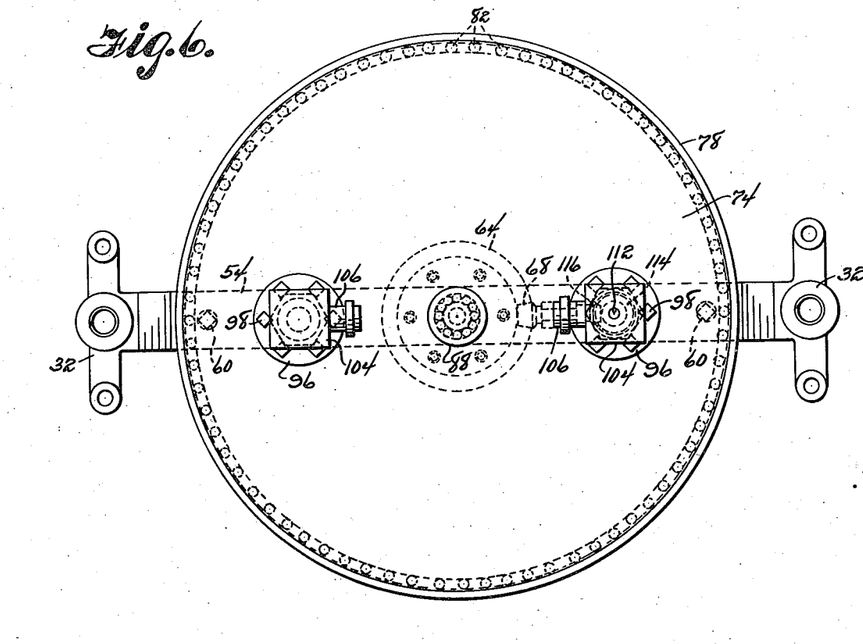
Figure 6 is a bottom plan view of the turntable structure.
Figure 7:
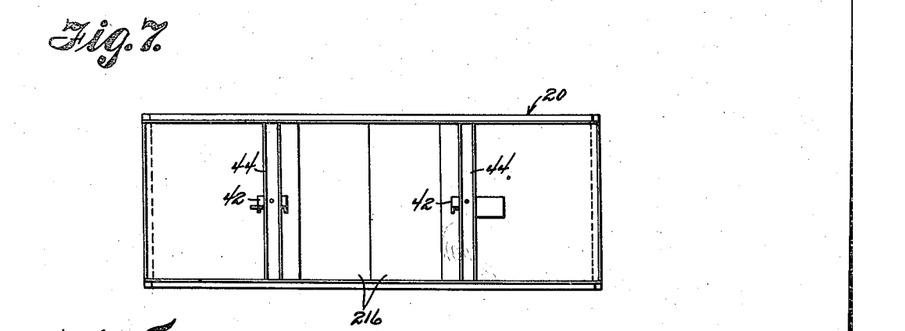
Figure 7 is a bottom plan view of the frame structure incorporated in the airplane for accommodating the tank and its manipulating mechanism.
Figure 8:
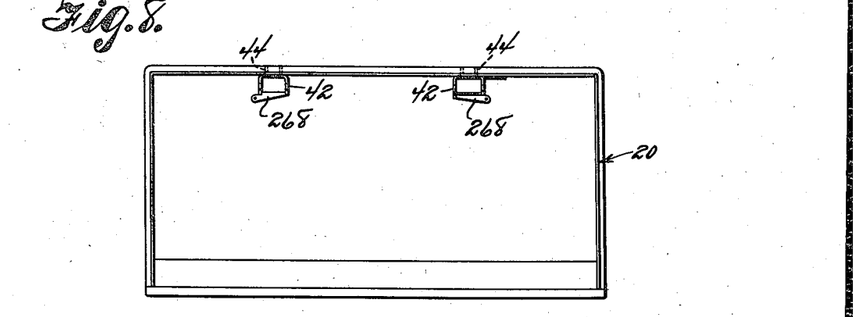
Figure 8 is a side view of the structure illustrated in Figure 7.
Figure 9:
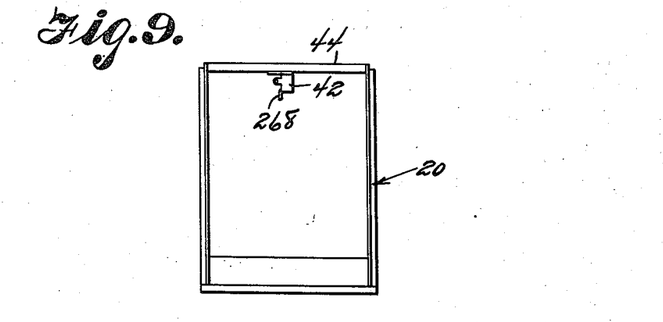
Figure 9 is an end view.

Figures 3 and 6 illustrate a supporting bar 54 connected with the two yokes 32 and supporting a turntable structure 56. This turntable structure comprises a large circular plate 58 fixedly secured to the bar 54 by bolts 60 extending through spacers 62 located between the bar 54 and the plate 58. To the plate 58 is fixedly secured a large bevel gear 64, as by bolts 66. A bevel pinion 68 meshes with the bevel gear 64 and is keyed to a shaft 70 supported in a bearing 72 on a rotary plate 74.

The rotary plate 74 is provided with an annular flange 76 welded to an annular flange 78 having an inturned flange 80 coacting with the plate 58 to provide a race for ball bearings 82.

Centrally of the plate 74 is located a hub 84 through which extends a shaft 86 having a flange 88 coacting with the hub to provide a race for ball bearings 90. A threaded shank 92 is provided on the shaft 86 and is extended through a bore in the bevel gear 64 and the plate 58 to be fixedly secured in position through the nut 94.

Depending from the plate 74 are two internally threaded tubes 96 bolted to the plate at 98. A vertical shaft 100 is threaded into each tube 96 and is fixedly secured in the desired position by a lock nut 102 engaging the end of its respective tube 96. Shafts 100 are preferably tubular and each is provided with a housing 104 at its lower end. A tubular pin 106 is secured to each housing 104 and provided with a circumferential flange 108. A shaft 112 extends through one of the shafts 100 and is provided with a bevel gear 114 at its upper end and in mesh with a bevel gear 116 keyed to the shaft 70. A bevel gear 118 is splined to the shaft 112 for rotation therewith but movable longitudinally thereon. The bevel gear 118 is located inside the housing 104 associated with the shaft 112 and meshes with a bevel gear 120 carried by a shaft 122 rotatable in one of the hollow pins 106. An opening 124 is provided in the end plate 126 of the one housing 104 for accommodating the shaft 112. The shaft 122 imparts rotary motion to the shaft 112 which in turn imparts rotary motion to the shaft 70 so that the plate 74 is rotated about the axis of the shaft 86.

Figure 10:
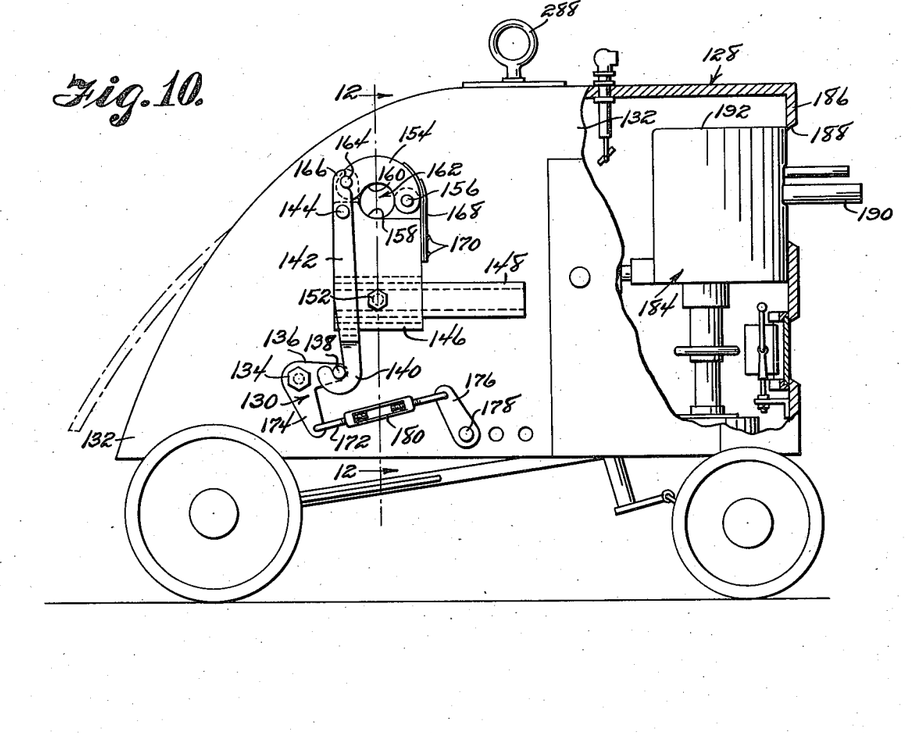
Figure 10 is a side elevational view of a tank with a portion broken away for the sake of illustration and illustrating a portion of the releasing means through the medium of which the tank operator may release the tank from the airplane from a position inside the tank.
Figure 11:
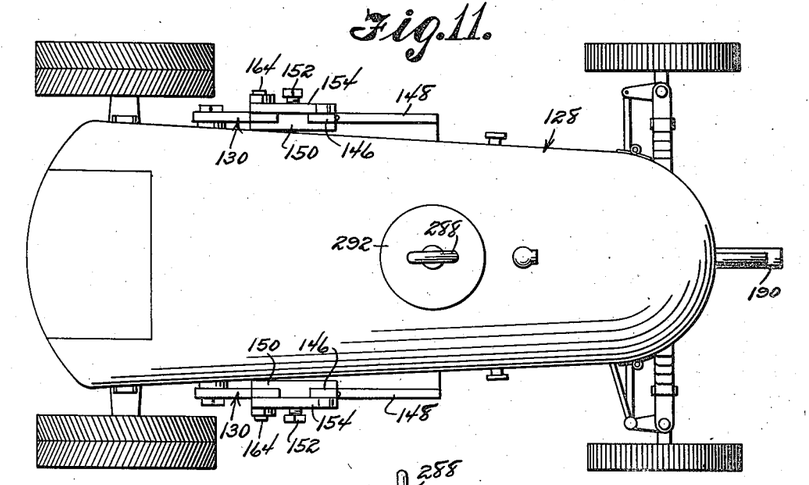
Figure 11 is a top plan view of the tank.
Figure 12:
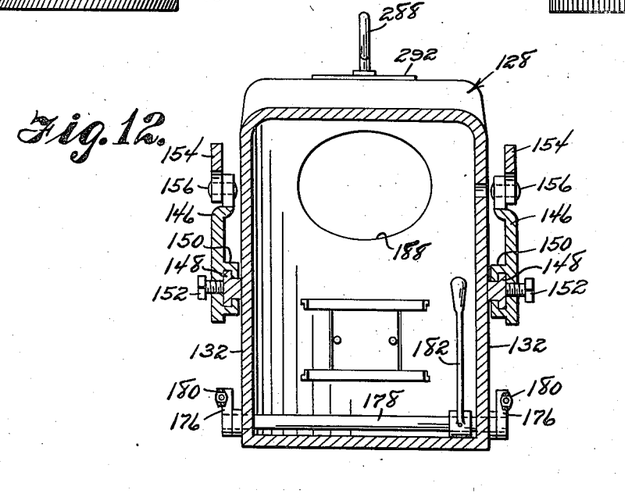
Figure 12 is a sectional view taken along the line 12—12 of Figure 10.
Figure 13:
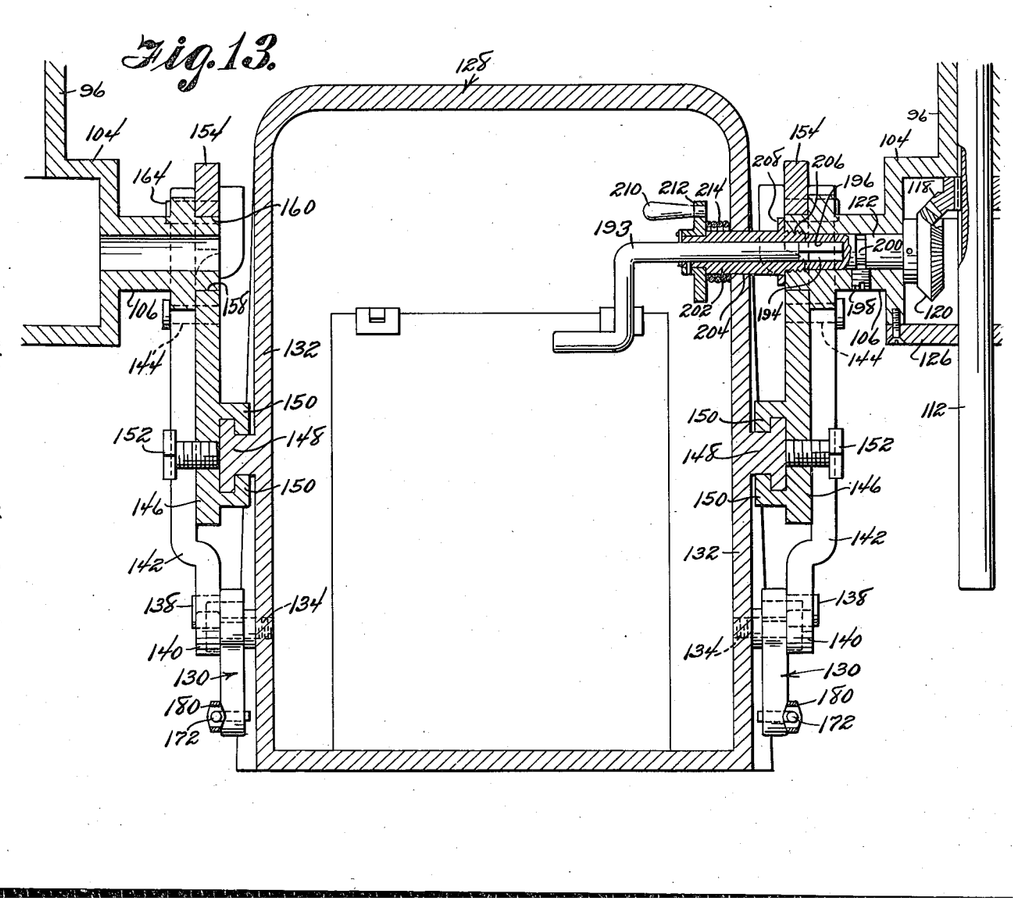
Figure 13 is an enlarged cross sectional view of the tank illustrating the turntable control operable from a position inside the tank.

A tank or armored car 128 is detachably connected with the pins 106. Figure 10 illustrates one of the connection means for one pin 106. These connection means are identical in construction and operation so that the description of one will apply to both. A bell crank 130 is located exteriorly of the tank 128 and is pivotally connected to its side wall 132 by a bolt 134. The arm 136 of the bell crank is provided with a pin 138 having hook engagement with a hook 140 formed at the lower end of a bar 142 pivoted intermediate its ends at 144 on a plate 146 adjustably mounted on a T rib 148 attached to the side wall 132. In Figures 12 and 13, the plate 146 is provided with flanges 150 slidably engaging the T rib 148 and fixedly securable thereto by a set screw 152.

In Figures 10, 12 and 13, a curved arm 154 is pivotally connected at 156 with the plate 146, the latter being provided with a curvature 158 coacting with the curvature 160 on the arm 154 to provide an opening 162 for receiving the end of one of the pins 106 extending beyond its flange 108. The free end of the arm 154 is provided with a pin 164 receivable in a shallow hook 166 at the end of the bar 142 opposite the hook 140. The arm 154 is yieldingly biased to the position of Figure 10 by a leaf spring 168 secured at 170 to one edge of the plate 142.

With the bell crank 130 positioned as shown in Figure 10, the pin 138 is connected with the hook 140 to restrain the bar 142 from pivotal movement about the axis of the pivot 144. Thus the arm 154 is firmly latched in the position shown so as to provide a closed loop or bearing having connection with the pin 106. Means for holding the bell crank 130 in the position of Figure 10 comprises a link 172 connected at one end with the arm 174 of the bell crank and at its other end with an arm 176 keyed to a shaft 178 rotatably journaled in the side walls 132. A turn buckle 180 is interposed in the link 172 for the purpose of securing precise adjustment thereof. The arm 154 may be unlatched from the shallow hook 166 through rotation of the shaft 178, as from a position inside the tank 128 through the medium of a lever 182 inside the tank.

When in the airplane, as when being transported from place to place, the tank is latched to the turntable structure. After landing the airplane, the tank may be lowered to a position on the ground and then unlatched from the turntable structure, at which time the tank is free from the airplane and may be operated as an independent unit. The tank will, of course, be provided with a suitable engine drive, which forms no part of the present invention.

In addition, the tank may be projected from the airplane and manipulated through the medium of the turntable structure for firing purposes. The tank is provided with a gun turret 184 which forms the subject matter of my application for patent on Gun turret, filed of even date herewith. Suffice it to say that the front wall 186 is provided with an opening 188 for accommodating the gun 190, which opening is covered by a movable shield 192.

In manipulating the tank when used for firing purposes and attached to the airplane the turntable structure is actuated from a position inside the tank through the medium of a crank 193, see Figure 13. This crank is provided with a square end 194 fitting in a correspondingly shaped socket 196 formed axially in the shaft 122, this shaft being restrained from relative axial movement in the pin 106 by a key 198 projecting into a groove 200 in the shaft. The crank 193 is rotatably guided in a sleeve 202 extending through an opening 204 in one of the side walls 132. The bore in the pin 106 is internally threaded for connection with the threaded end 206 on the sleeve 202, and a flange 208 is provided on the sleeve 202 for engagement with the end of the pin 106 when the sleeve is threaded home. A crank 210 is connected with the sleeve 202 so that the latter may be unthreaded from the pin 106 from a position inside the tank. Between the wall 132 and the plate 212 to which the crank 210 is connected is interposed a compression spring 214 which restrains the crank structure from accidental rotation. Thus the sleeve 202 may be disconnected from the pin 106 when the tank 128 is to be released from the airplane.

Figure 4:
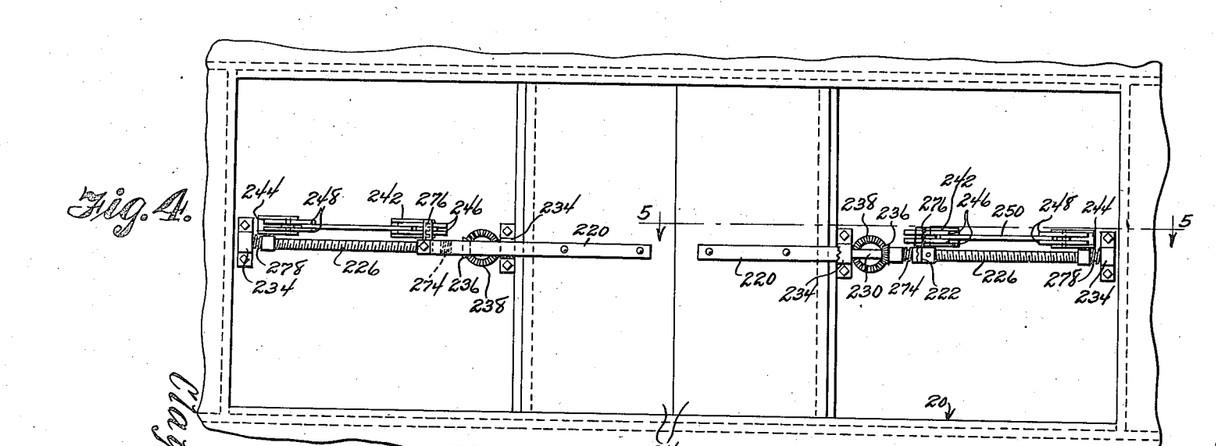
Figure 4 is a bottom plan view of a door structure incorporated in the airplane through which the tank may be loaded and unloaded.
Figure 5:
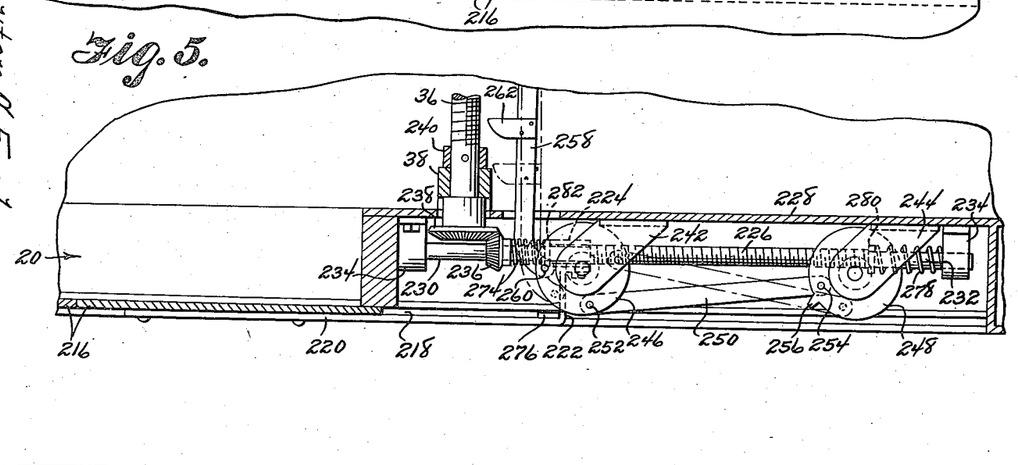
Figure 5 is a sectional view along the line 5—5 of Figure 4.

Figure 4 illustrates a bottom plan view of two doors 216 mounted on the frame 20 and through which the tank 128 may be projected when the doors are moved to open positions. The two doors are slidably mounted in a common plane in the frame 20, as in grooves 218. Each door 216 is operatively connected with one of the screws 36. Since the operating connections are identical in construction and operation, the description of one will apply to both. In Figure 5, the door 216 has a bar 220 fixedly secured thereto and provided with a right angular arm 222 fixedly secured to a sleeve 224 adapted for threaded connection with a screw 226 lying underneath the floor 228 and in parallelism with the plane of movement of the door 216.

The screw 226 is provided with unthreaded shaft portions 230 and 232, which portions are rotatably supported in bearings 234 secured to the floor 228. A bevel gear 236 is fixedly secured to the shaft 230 and meshes with a gear 238 fixedly secured to the screw 36. A collar 240 is secured to the screw 36 and engages the bearing 38 to support the screw and its load.

Brackets 242 and 244 are attached to the floor 228, the bracket 242 rotatably supporting a disk 246 and the bracket 244 rotatably supporting a disk 248. A rigid link 250 is pivotally connected at 252 with the disk 246 and at 254 with the disk 248. A pawl 256 on the disk 248 extends beyond the peripheral surface thereof and lies above the groove 218 in the closed position of the door 216.

To the disk 246 is pivotally connected the lower end of an upright bar 258, as at 260, this bar being provided with a pawl 262 lying in the path of the yoke 32, during its downward movement only, sliding on the guide rods 28 associated with the screw 36. In Figure 3, the two upright bars 258 are pivotally connected at their upper ends with disks 264, as at 266. The brackets 42 are provided with arms 268 to which the respective disks 264 are rotatably connected, as at 270. Each bar 258 is also provided with an upper pawl 272 also lying in the path of the respective yokes 32 during upward movement of the yokes 32.

The bars 258 are so pivotally connected with their respective disks 246 and 264 as to lie in converging relationship downwardly when the yokes 32 descend so that the bars are moved downwardly only when the yokes 32 engage the pawls 262. Similarly, downward movement of the bars 258 brings the bars into converging relationship upwardly so as to bring the pawls 272 into the paths of the two yokes 32 as the yokes travel upwardly on the screws 36.

In Figure 5, the door 216 is in its closed position and the sleeve 224 encircles the shaft 230. As the yokes 32 move downwardly, as when the tank 128 is to be projected to a position outside the airplane, rotation of the screw 226 brings the sleeve 224 into threaded connection therewith, since a compression spring 274 is interposed between the sleeve and the gear 236. As the sleeve 224 moves to the right along the screw 226 for bringing the door 216 to its full open position, downward movement of the bar 258, when engaged by its respective yoke 32, rotates the disk 246 in a counter-clockwise rotation for imparting similar rotation to the disk 248. The bar 220 is provided with an arm 276 which takes a position to the right of the pawl 256 so as to positively latch the door in its open position. Rotary motion is imparted to the disk 248 after the arm 276 is in its extreme position from that shown in Figure 5. At this time the sleeve 224 is advanced onto the shaft 232 so as to discontinue its advancing movement toward the right. A compression spring 278 is mounted on the shaft 232 and is engageable by the sleeve 224. This spring is interposed between a washer 280 slidable on the shaft 232 and one of the bearings 234. A similar washer 282 is provided on the shaft 230.

In the same way, elevation of the tank 128 to a position inside the airplane brings the yokes 32 into engagement with the pawls 272 at such a time as to preclude unlatching of the doors before the tank is clear thereof. The axis of the pivot 252, see Figure 5, is preferably located so as to lie above the axis of the disk 246 in the door latching position of the pawl 256.

Figures 14, 15, 16, 17, 18:
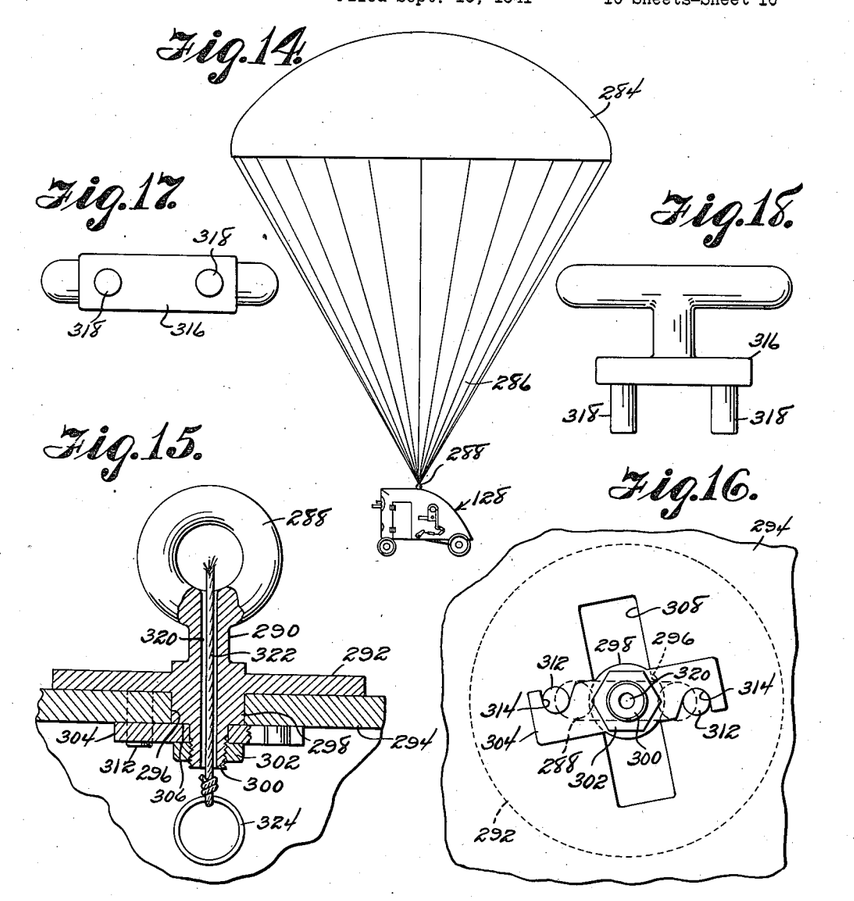
Figure 14 is a diagrammatic view illustrating the tank suspended from a parachute.
Figure 15 is an enlarged sectional view illustrating the manner in which the rip cord of the parachute is accessible from a position inside the tank.
Figure 16 is an inside face view of the rip structure of the tank illustrating a parachute release.
Figure 17 is an end view of a parachute eye releasing tool.
Figure 18 is a side view of the releasing tool.

Figure 14 illustrates the tank 128 connected with a parachute 284. The shroud lines 286 are connected with a ring 288 having a tubular neck 290 provided with a flange 292. The top wall 294 of the tank is provided with a bore 296 through which the shaft part 298 of the neck 290 is projected. A threaded shank 300 is provided at the end of the shaft 298 for connection with a nut 302 which clamps a latch bar 304 between the nut and end 306 of the shaft.

A slot 308 is provided in the top wall 294 through which the latch bar 304 may be projected when brought into registration with the slot. Two pins 312 are secured to the top wall 294 and are receivable in recesses 314 in the latch bar when rotated in one direction to a position substantially at right angles to the slot 308. After making a parachute landing, the parachute may be released from the tank 128 from a position inside the latter through rotation of the latch bar 304 into registration with the slot 308. Such rotation may be accomplished by a tool 316 having fingers 318 arranged to straddle the latch bar 304 so that the latter may be rotated by the tool.

The bore 320 in the neck 290 provides accommodation for the rip cord 322, the latter being provided with a ring 324 accessible from a position inside the tank.

Without further elaboration, the foregoing will so fully illustrate my invention, that others may, by applying current knowledge, readily adapt the same for use under various conditions of service.

I claim:

1. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, and manually actuated means accessible from a position inside said tank and operatively connected with said turntable for rotating the latter and said tank.

2. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, manually actuated means accessible from a position inside said tank and operatively connected with said turntable for rotating the latter and said tank, said second named means comprising in part rotatably mounted vertical screws having threaded connections with said turntable, doors slidably mounted on said body to close said door opening, and screw means operatively connected with said vertical screws and with the respective doors to respectively open and close the same before said tank is projected through said door opening and after the tank has been brought to a position inside said body.

3. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, manually actuated means accessible from a position inside said tank and operatively connected with said turntable for rotating the latter and said tank, said second named means comprising in part rotatably mounted vertical screws having threaded connections with said turntable, doors slidably mounted on said body to close said door opening, screw means operatively connected with said vertical screws and with the respective doors to respectively open and close the same before said tank is projected through said door opening and after the tank has been brought to a position inside said body, latches for said doors in their open positions, and means actuated through vertical movement of said turntable when in predetermined lowered and raised positions for bringing said latches into door holding positions and door releasing positions, respectively.

4. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, manually actuated means accessible from a position inside said tank and operatively connected with said turntable for rotating the latter and said tank, said attaching means comprising pins carried by said turntable, and clamp devices mounted on said tank and detachably connected with the respective pins.

5. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, manually actuated means accessible from a position inside said tank and operatively connected with said turntable for rotating the latter and said tank, and power operated means for actuating said second mentioned means.

6. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, manually actuated means accessible from a position inside said tank and operatively connected with said turntable for rotating the latter and said tank, said second mentioned means including rotatably mounted vertical screws having threaded connection with said turntable, two sliding doors for said door opening, door operating screws operatively connected with said vertical screws, operating connections between the respective doors and said door operating screws, and means actuated through raising and lowering of the turntable for latching and unlatching said two doors in their opened and closed positions, respectively.

7. The combination of an aircraft body having a door opening in the bottom thereof, a tank, a turntable guided for vertical movement inside said aircraft body above said door opening, attaching means for detachably connecting the tank with said turntable and controllable from a position inside the tank for disconnecting the latter from the turntable, means for imparting vertical movement to said turntable to lift the tank to a position inside said aircraft body or to project the tank through said door opening and to a position outside the aircraft body, manually actuated means accessible from a position inside said tank and operatively connected with said turntable for rotating the latter and said tank, vertical guide rods for said turntable, and yokes attached to the turntable and guidingly engaging said rods, said second mentioned means including rotatably mounted vertical screws threadedly connected with the respective yokes.

CLAYTON G. FOGLE.